US010930900B2

(12) United States Patent
Liu et al.

(10) Patent No.: US 10,930,900 B2
(45) Date of Patent: Feb. 23, 2021

(54) BATTERY CELL FOR ELECTRIC VEHICLE BATTERY PACK

(71) Applicant: SF Motors, Inc., Santa Clara, CA (US)

(72) Inventors: Ying Liu, Santa Clara, CA (US); Kent Wing Kin Chung, Santa Clara, CA (US); Scott Quinlan Freeman Monismith, Santa Clara, CA (US); Jeremy Andrew Elsberry, Santa Clara, CA (US); Yifan Tang, Santa Clara, CA (US)

(73) Assignee: SF Motors, Inc., Santa Clara, CA (US)

( * ) Notice: Subject to any disclaimer, the term of this patent is extended or adjusted under 35 U.S.C. 154(b) by 125 days.

(21) Appl. No.: 16/122,567

(22) Filed: Sep. 5, 2018

(65) Prior Publication Data

US 2019/0296270 A1    Sep. 26, 2019

Related U.S. Application Data

(60) Provisional application No. 62/646,992, filed on Mar. 23, 2018.

(51) Int. Cl.
| | |
|---|---|
| *H01M 2/02* | (2006.01) |
| *H01M 2/10* | (2006.01) |
| *H01M 10/04* | (2006.01) |
| *H01M 2/04* | (2006.01) |

(52) U.S. Cl.
CPC ....... *H01M 2/0237* (2013.01); *H01M 2/0408* (2013.01); *H01M 2/1083* (2013.01); *H01M 10/04* (2013.01)

(58) Field of Classification Search
None
See application file for complete search history.

(56) References Cited

U.S. PATENT DOCUMENTS

| | | | | |
|---|---|---|---|---|
| 2002/0155349 A1* | 10/2002 | Cheiky | ................ | H01M 2/02 429/176 |
| 2006/0093904 A1* | 5/2006 | Cheon | ................ | H01M 2/0413 429/163 |
| 2008/0182159 A1 | 7/2008 | Mitani et al. | | |

FOREIGN PATENT DOCUMENTS

| | | |
|---|---|---|
| CN | 104733775 | 6/2015 |
| CN | 106058306 | 10/2016 |

OTHER PUBLICATIONS

International Search Report and Written Opinion on PCT/CN2019/087024 dated Aug. 9, 2019 (9 pages).

* cited by examiner

*Primary Examiner* — Karie O'Neill Apicella
(74) *Attorney, Agent, or Firm* — Foley & Lardner LLP; James De Vellis

(57) ABSTRACT

A battery cell for an electric vehicle battery pack can include a housing and a gasket. The housing can define a sidewall of the battery cell that extends between an open end of the housing and a closed end of the housing. The open end of the housing can include an uneven rim pattern having a plurality of peak regions and a plurality of valley regions to define a plurality of tabs. The plurality of peak regions can engage the gasket to seal the housing with the gasket. Each of the plurality of tabs can define a respective flat crimped area. Each flat crimped area can have a surface area between one square millimeter and five square millimeters. At least one of the flat crimped areas can provide a surface for bonding with a wire.

20 Claims, 13 Drawing Sheets

1300

PROVIDE BATTERY CELL
1305

FIG. 13

BATTERY CELL FOR ELECTRIC VEHICLE BATTERY PACK

CROSS-REFERENCE TO RELATED APPLICATIONS

The present application claims priority under 35 U.S.C. § 119 U.S. Provisional Patent Application 62/646,992, filed Mar. 23, 2018 and titled "BATTERY CELL FOR ELECTRIC VEHICLE BATTERY PACK," which is incorporated herein by reference in its entirety.

BACKGROUND

Electric vehicles such as automobiles can include on-board battery cells or battery packs to power the electric vehicles. It can be difficult to form electrical connections with terminals of such battery cells.

SUMMARY

At least one aspect of this disclosure is directed to a battery cell of a battery pack to power an electric vehicle. The battery cell can include a housing. The battery cell can include a gasket. The housing can define a sidewall of the battery cell. The sidewall can extend between an open end of the housing and a closed end of the housing. The open end of the housing can include an uneven rim pattern having a plurality of peak regions and a plurality of valley regions to define a plurality of tabs. Each of the plurality of tabs can include a respective one of the plurality of peak regions. The plurality of peak regions can engage the gasket to seal the housing with the gasket. Each of the plurality of tabs can define a respective flat crimped area extending in a direction perpendicular to the sidewall of the battery cell with a slope of less than 10 degrees. Each flat crimped area can have a surface area between one square millimeter and five square millimeters. At least one of the flat crimped areas can provide a surface for bonding with a wire.

At least one aspect of this disclosure is directed to a method of providing a battery cell. The method can include providing a housing having an open end and a closed end. The housing can define a sidewall of the battery cell that extends between the open end of the housing and the closed end of the housing. The open end of the housing can include an uneven rim pattern having a plurality of peak regions and a plurality of valley regions to define a plurality of tabs. The method can include providing a gasket inside the housing. The method can include performing at least one crimping operation on the housing to define a neck region of the housing to support a first polarity terminal of the battery cell and to cause the plurality of tabs to engage the gasket such that each tab defines a respective flat crimped area having a surface area between one square millimeter and five square millimeters extending in a direction perpendicular to the sidewall of the battery cell with a slope of less than 10 degrees to seal the housing to the gasket. The method can also include bonding a wire to the flat crimped area of at least one tab of the plurality tabs.

At least one aspect of this disclosure is directed to a method. The method can include providing a battery cell of a battery pack to power an electric vehicle. The battery cell can include a housing. The battery cell can include a gasket. The housing can define a sidewall of the battery cell. The sidewall can extend between an open end of the housing and a closed end of the housing. The open end of the housing can include an uneven rim pattern having a plurality of peak regions and a plurality of valley regions to define a plurality of tabs. Each of the plurality of tabs can include a respective one of the plurality of peak regions. The plurality of peak regions can engage the gasket to seal the housing with the gasket. Each of the plurality of tabs can define a respective flat crimped area extending in a direction perpendicular to the sidewall of the battery cell with a slope of less than 10 degrees. Each flat crimped area can have a surface area between of one square millimeter and five square millimeters. At least one of the flat crimped areas can provide a surface for bonding with a wire.

At least one aspect of this disclosure is directed to an electric vehicle. The electric vehicle can include at least one battery pack installed therein. The battery pack can include at least one battery cell. The battery cell can include at least one housing and at least one gasket. The housing can define a sidewall of the battery cell. The sidewall can extend between an open end of the housing and a closed end of the housing. The open end of the housing can include an uneven rim pattern having a plurality of peak regions and a plurality of valley regions to define a plurality of tabs. Each of the plurality of tabs can include a respective one of the plurality of peak regions. The peak regions can engage the gasket to seal the housing to the gasket. Each of the plurality of tabs can define a respective flat crimped area extending in a direction perpendicular to the sidewall of the battery cell with a slope of less than 15 degrees. Each flat crimped area can have a surface area between one square millimeter and five square millimeters. At least one of the flat crimped areas can provide a surface to bond with a wire.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 13 depicts a flow chart of an example process of providing a battery cell for a battery pack of an electric vehicle, according to an illustrative implementation.

Following below are more detailed descriptions of various concepts related to, and implementations of, methods, apparatuses, and systems of battery cells for electric vehicles. The various concepts introduced above and discussed in greater detail below may be implemented in any of numerous ways, as the described concepts are not limited to any particular manner of implementation.

DETAILED DESCRIPTION

Systems and methods described herein relate to lithium ion or other battery cells for battery packs (or battery modules) that can provide power to electric vehicles ("EVs"). It can be a technical challenge to assemble lithium ion battery cells into a battery pack. The battery cells can be, for example, 21700 type battery cells having a diameter of between 19 millimeters and 23 millimeters and a height between 65 millimeters and 75 millimeters. Other dimensions are also possible. A battery pack can include, for example, 20-100 battery cells arranged in parallel or series with one another. Battery packs can also include numbers of battery cells outside these ranges. Terminals of the battery cells can be ultrasonically bonded to current collector plates (e.g., busbars) of the battery packs using aluminum wires to assemble a battery pack out of a plurality of battery cells. However, the process of bonding a wire to a terminal of a battery cell can impose certain requirements on the battery cell. For example, the battery cell may need to have suitable small-scale topography. If the surface of the material is too rough, the instrument can face more difficulty bonding. Further, the battery cell may need to be made of a suitable material. In addition, the terminal of the battery cell may need to have a suitably flat surface for bonding with the wires.

Achieving a flat surface on a terminal of a battery cell can be a challenge. For example, a lip or rim of a housing can act as or include a negative terminal of the battery cell that can be formed into a crimped area. The crimped area can be positioned at the lip or rim of the housing, and can be configured to serve as the negative terminal. For example, the crimped area can be used for wire bonding to the current collector. However, this surface can be small and can be difficult to flatten. For example, the surface may have a width of less than 2 millimeters. Attempting to form the crimped area into a flatter surface can cause large material strains on the housing, thereby weakening the housing. Thus, it can be difficult to successfully bond a wire to the crimped area.

Figure 1:
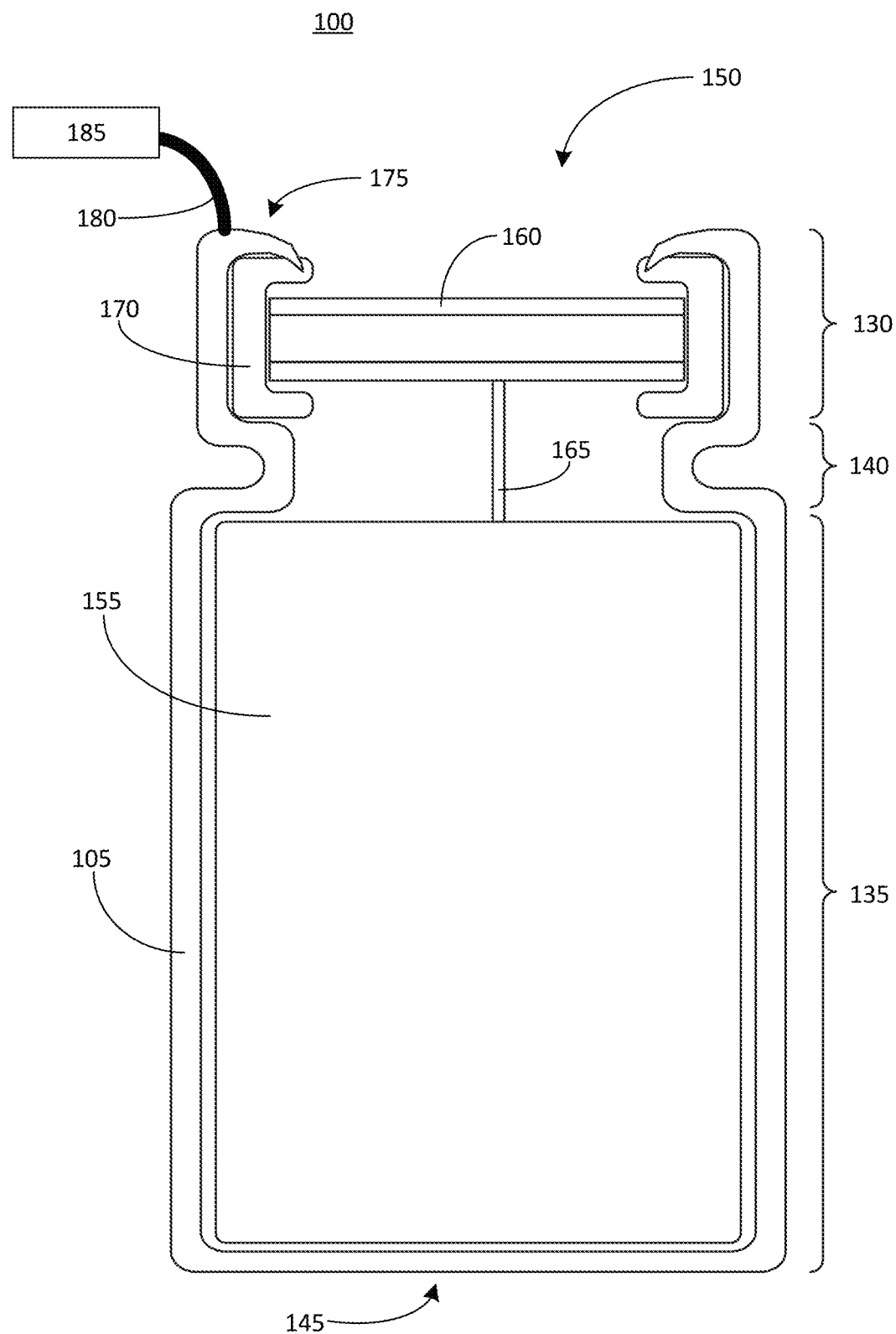
FIG. 1 depicts a cross-sectional view of an example battery cell for an electric vehicle battery pack, according to an illustrative implementation.

FIG. 1 depicts a cross-sectional view of an example battery cell 100 for an electric vehicle battery pack. The battery cell 100 can include a housing 105. The housing can include a head portion 130 and a body portion 135. A neck portion 140 can be positioned between the head portion 130 and the body portion 135. Thus, the housing 105 can define a sidewall of the battery cell 100, which extends between a closed end 145 of the housing 105 and an open end 150 of the housing 105. The sidewall can include any portion of the housing 105 between the closed end 145 and the open end, including any portion of the housing 105 in the body region 135, the neck region 140, and the head region 130. The height of the battery cell 100 (e.g., the distance between the closed end 145 of the housing 105 and the open end 150 of the housing 145) can be between 65 millimeters and 75 millimeters. A diameter of the battery cell (e.g., a distance across the body region 135) can be between 19 millimeters and 23 millimeters. The body portion of the housing 105 contains an electrolyte material 155 (also referred to as a "jelly roll" 155) that provides electric power. At least a portion of the electrolyte material 155 can be electrically connected with a first polarity terminal 160 of the battery cell 100, via a connecting element 165. The first polarity terminal 160 is supported within the head region 130 by the neck region 140 of the housing 105. A gasket 170 surrounds the first polarity terminal 160 and electrically insulates the first polarity terminal 160 from the housing 105. The gasket 170 can be formed from an electrically insulating material, such as a plastic or rubber material. For example, the gasket 170 can be formed from polypropylene.

A portion of the housing 105 can include or be configured as a second polarity terminal. For example, a crimped area 175 at the open end 150 of the battery cell 100 can serve as the second polarity terminal. A wire 180 can be bonded at one end to the crimped area 175 of the housing 105. The other end of the wire 180 can be bonded to a current collector 185 (sometimes also referred to herein as a busbar 185). Thus, the wire 180 can carry electric current from the housing 105 (i.e., the second polarity terminal) to the current collector 185. To facilitate use of a portion of the housing 105 as the second polarity terminal, the housing 105 can be formed from a conductive material, such as a metal or an alloy. For example, the housing 105 can be formed from or can include steel, copper, or aluminum.

Figure 2:
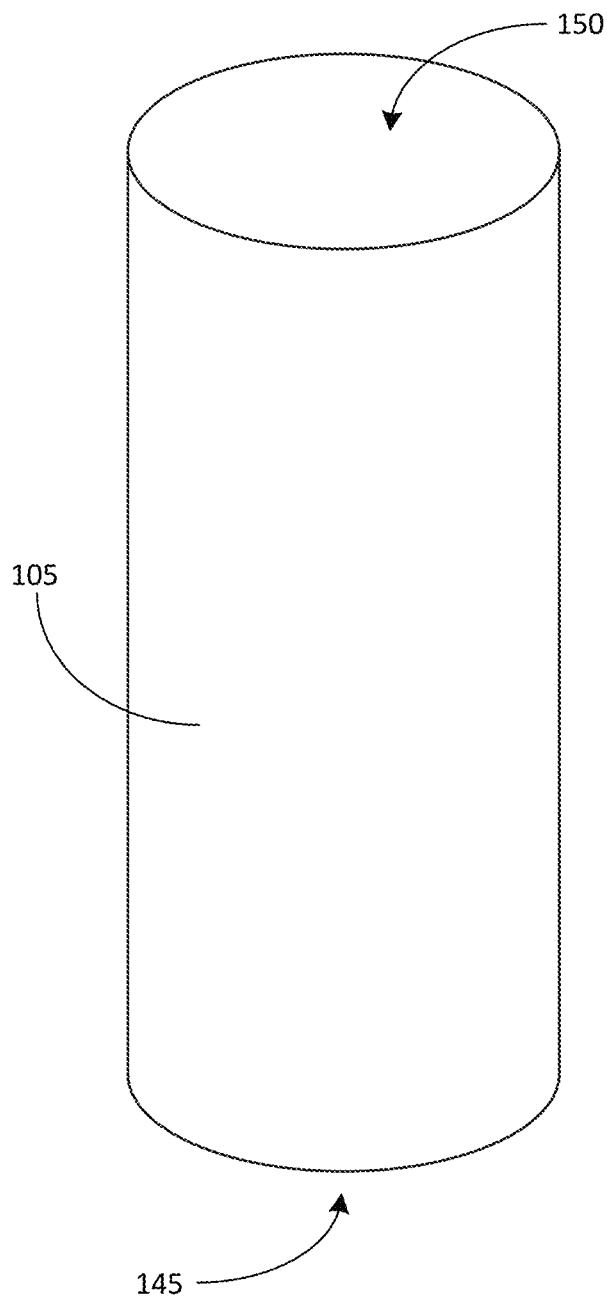
FIG. 2 depicts an example housing for a battery cell, according to an illustrative implementation.

FIG. 2 depicts an example housing 105 for a battery cell 100 in an unassembled state, separate from the battery cell 100. The housing 105 in the unassembled state can be cylindrical in shape, and can be defined by a sidewall that extends between the closed end 145 and the open end 150. During assembly of the battery cell 100, the housing 105 can undergo one or more crimping steps in which portions of the unassembled cylindrical housing 105 shown in FIG. 2 are bent or deformed in order to define the head 130, the body 135, and the neck 140 shown in FIG. 1. The one or more crimping steps can also cause an edge of the open end 150 of the housing 105 to engage, press, or dig into the gasket 170, as illustrated in FIG. 1. Engagement of the housing 105 with the gasket 170 in this manner can help to ensure a good seal between the housing 105 and the gasket 170. For example, this seal can help to ensure that the first polarity terminal 160 remains securely held in place, and that the electrolyte 155 is sealed within the housing 105.

As a result of the crimping process that causes the edge of the open end 150 of the housing 105 to engage the gasket 170, a surface of the housing at the crimped area 175 can become curved, as this curvature helps the exposed edge of the housing 105 to engage the gasket 170. However, this curvature of the crimped area 175 renders the crimped area 175 sloped, deformed, or otherwise less flat than it otherwise would be, which can make it more difficult to successfully bond the wire 180 to this portion of the housing 105. For example, wire bonding techniques such as ultrasonic bonding can require a flat surface in order to form a secure bond. Thus, the curvature of the crimped area 175 that results from the crimping process can increase a wide bonding failure rate.

Figure 3:
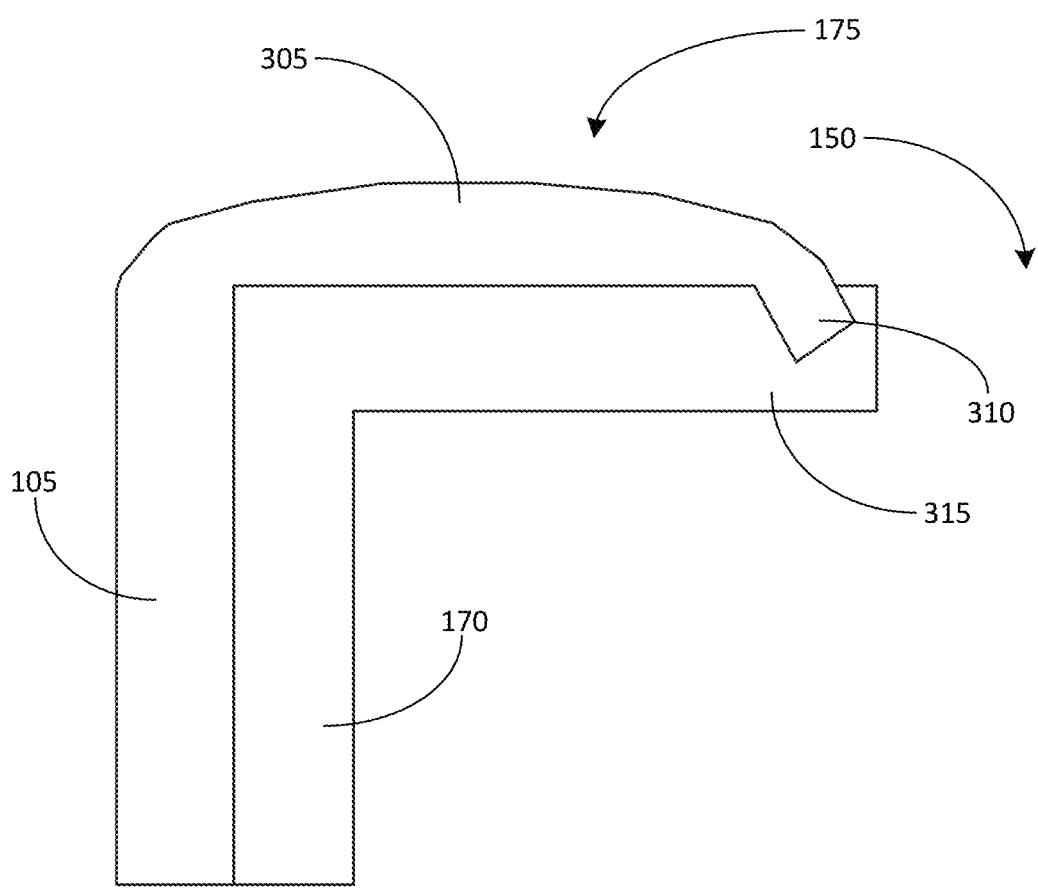
FIG. 3 depicts an example crimped area of a battery cell, according to an illustrative implementation.
Figure 4:
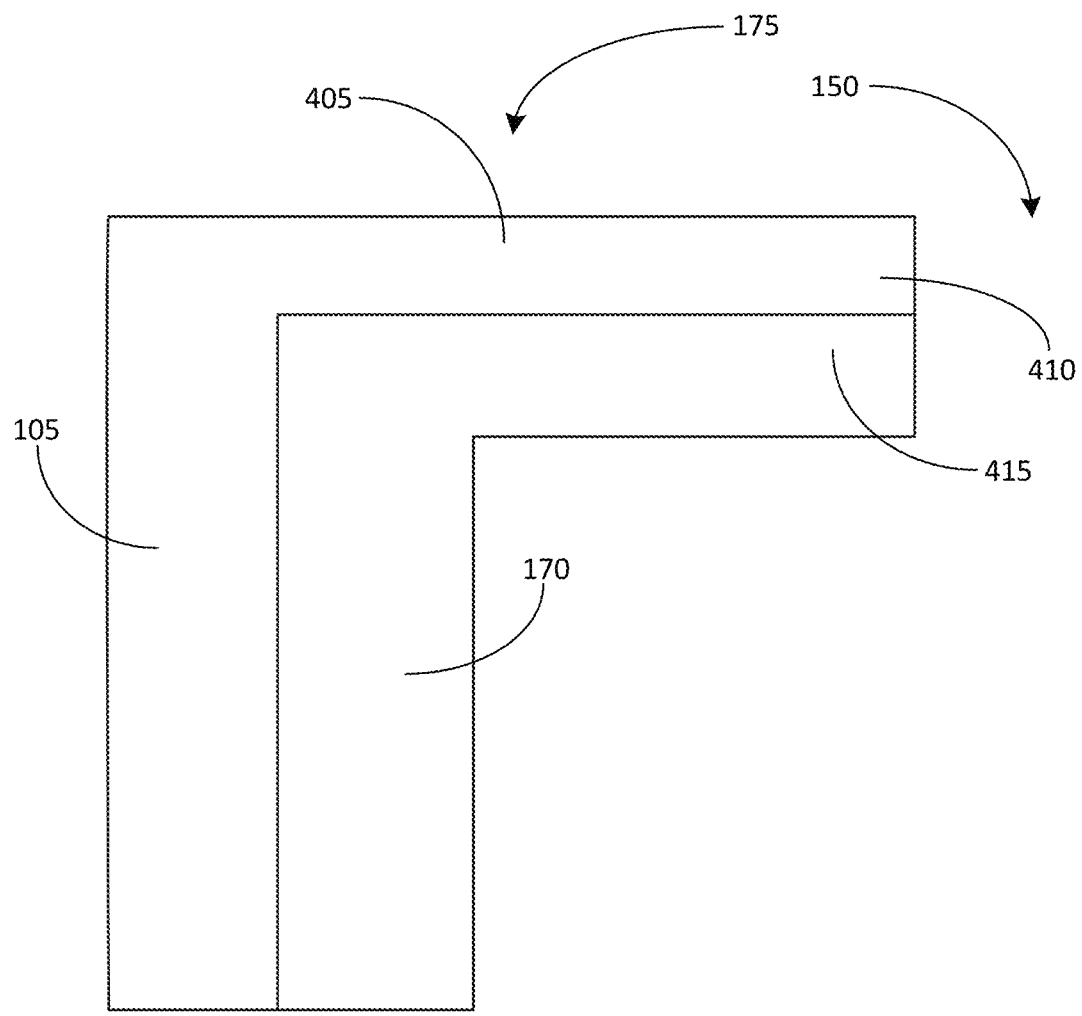
FIG. 4 depicts an example crimped area of a battery cell, according to an illustrative implementation.

FIG. 3 depicts an example crimped area 175 of a housing 105 of a battery cell 100. The crimped area 175 as depicted in FIG. 4 is enlarged relative to the view of the crimped area 175 shown in FIG. 1, to illustrate the curvature that can result from crimping a cylindrical housing 105. An edge portion 310 of the housing 105 can fully engage an edge 315 of the gasket 170, thereby forming an effective seal around the open end 150 of the housing 105. However, as a result of the deformation of the housing 105 needed to fully engage with the gasket 170, an upper surface of the crimped area 175 exhibits a curved or sloped area 305 that can make it difficult to successfully bond a wire, such as the wire 180 shown in FIG. 1, to the crimped area 175 of the housing 105. For example, while the upper surface of the gasket 170 may remain flat, the surface of the housing 105 can bulge away from the gasket 170 due to the crimping process that allows the edge portion 310 of the housing 105 to fully engage the edge 315 of the gasket 170. Thus, the curved area 305 of the housing 105 may have a rounded, non-uniform shape that makes it difficult to bond a wire to that housing 105. In addition, crimping the housing 105 to engage the gasket 175 as shown in FIG. 3, as well as further deforming the housing 105 in an attempt to flatten the curved or sloped area 305 of the crimped area 175, can cause large elastic strains to build up in the material of the housing 105. Such elastic strains can cause the housing 105 to ripple or buckle. The topography of the housing 105 in the crimped area 175 therefore becomes even more unsuitable for bonding of the wire 180.

FIG. 4 depicts an example crimped area 175 of a housing 105 of a battery cell 100. The crimped area 175 shown in FIG. 4 differs from that shown in FIG. 3 in that the crimped area 175 of FIG. 4 includes a flat area 405 that can serve as a surface for bonding of the wire 180 with a high bonding success rate relative to the curved or sloped area 305 shown in FIG. 3. The flat area 405 can be aligned with the flat portion of the gasket 170 beneath it. The flat area 405 may not exhibit deformation or curvature, as shown in FIG. 3. However, to achieve the flat area 405 within the crimped area 175, an edge portion 410 of the housing 105 is crimped but does not fully engage an edge 415 of the gasket 170 as it does in the view shown in FIG. 3. As a result, while the crimped area 175 of FIG. 4 may provide a flat surface for wire bonding, there may not be an effective seal formed between the housing 105 and the gasket 170, because the edge portion 410 of the housing 105 is not pressed into the gasket 170 to fully engage the gasket 170 as shown in FIG. 4. Thus, FIGS. 3 and 4 illustrate an example design tradeoff that can exist when crimping a cylindrical housing, such as the housing 105 shown in FIG. 2, to form a battery cell 100 having a head portion 130, a body portion 135, and a neck portion 140. In order to provide a flat area or surface 405 for bonding of a wire at the open end 150 of the housing 105, the housing 105 may not be crimped in a manner that fully engages the gasket 170, as illustrated in FIG. 4. This can lead to an ineffective seal formed between the housing 105 and the gasket 170. However, crimping the housing in a manner that fully engages the gasket 170, as shown in FIG. 3, can cause the crimped area 175 to become bent, deformed, or curved with curved or sloped area 305 in a way that can prevent successful wire bonding at the crimped area 175. In order to address this technical challenge, the shape of the housing 105 can be altered. For example, the systems and methods described herein provide techniques for forming a crimped area 175 that exhibits both engagement of the housing 105 with the gasket 170, as shown in FIG. 3, as well as a flat surface in the crimped region 175, as shown in FIG. 4. Stated differently, this disclosure provides techniques that can be used to form a crimped area 175 that does not exhibit either a lack of engagement of the housing 105 with the gasket 170, as shown in FIG. 4, or a curved surface in the crimped region 175, as shown in FIG. 3.

Figure 5:
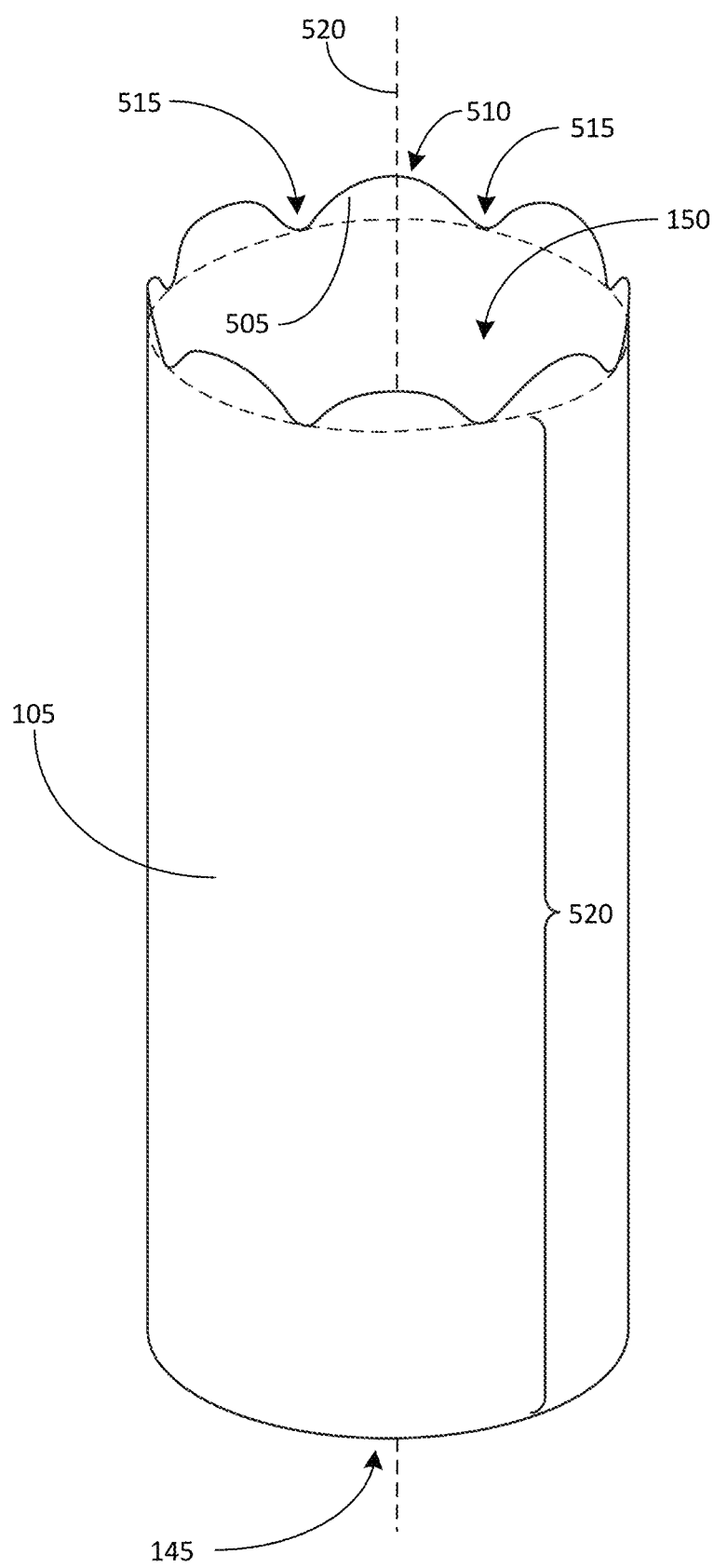
FIG. 5 depicts an example housing for a battery cell, according to an illustrative implementation.

FIG. 5 depicts an example housing 105 for a battery cell, according to an illustrative implementation. The housing 105 is shown in an unassembled states (e.g., before a crimping process) in FIG. 5. For example, the housing 105 of FIG. 5 can be or include a hollow tube having a sidewall that extends between a closed end 145 and an open end 150. However, the housing 105 shown in FIG. 5 differs from the housing 105 shown in FIG. 2 in that the housing 105 shown in FIG. 5 includes an uneven rim pattern at the open end 150. The uneven rim pattern includes a plurality of peak regions 510 and a plurality of valley regions 515, which together define a plurality of tabs 505 at the open end 150 of the housing 105.

In the example of FIG. 5, the rim pattern includes eight peak regions 510 and eight valley regions 515. Both the peak regions 510 and the valley regions 515 have a curved wavelike shape. The rim pattern shown in FIG. 5 exhibits radial symmetry about a central axis 520 of the housing 105. Stated differently, the tabs 505 are arranged in a radially symmetric fashion around the rim at the open end 150 of the housing 105. However, in other implementations, the rim pattern can be a semicircular pattern, a wave pattern, a U-shaped pattern, a triangular pattern, a square pattern, a jagged peak pattern, a saw tooth pattern, or any other series of peak regions 510 and valley regions 515. The rim pattern can also include combinations of more than one pattern. The rim pattern can be symmetrical or asymmetrical. For example some peak regions 510 or valley regions 515 can be larger, smaller, or differently shaped than others. There can be between two and 12 peaks or valleys present in the rim pattern.

To create the uneven rim pattern at the open end 150 of the housing 105, the housing 105 can be stamped to specifications to include the desired rim pattern. The housing 105 may also start in a cylindrical configuration, similar to that shown in FIG. 2 in which the rim pattern at the open end 150 of the housing 105 is even. Then, some material can be removed from the open end 150 of the cylindrical housing 105 to create the desired rim pattern. Material can be removed in such a way to allow a height of the housing 105 between the closed end 145 of the housing 105 and the valley regions 515 is equal to a height of the battery cell to be formed from the housing 105. Stated differently, the height 520 shown in FIG. 5 that extends from the closed end 145 of the housing 105 up to the valley regions 515 can be equal to a height of the battery cell to be formed. This height can be in the range of 65 millimeters to 75 millimeters. Thus, the tabs 510 may extend beyond this height. The tabs themselves may have a length between 1 millimeter and 10 millimeters. Length of the tabs can be measured, for example, as the distance between the bottom of the valley regions 515 and the top of the peak regions 510 in the direction of the height 520.

The housing 105 having the uneven rim pattern as shown in FIG. 5 can then be subjected to a crimping process similar to that described above. However, by changing the geometry of the housing 105 to have the uneven rim pattern with tabs 505 defined by peak regions 510 and valley regions 515 before the crimping procedure, the resulting battery cell can alleviate the elastic strains that can build up when a cylindrical housing, such as the housing 105 shown in FIG. 2, is crimped. For example, each of the tabs 505 is separated from adjacent tabs on either side by the valley regions 515. The valley regions 515 can therefore allow the material of each tab 505 to spread out when crimped without pressing against an adjacent tab 505. This can help to prevent rippling, sloping, or waviness imparted in the crimped area that results from the constraints imposed upon a cylindrical housing 105 with an even rim pattern during the crimping operation. An example of this is shown in FIG. 6.

Figure 6:
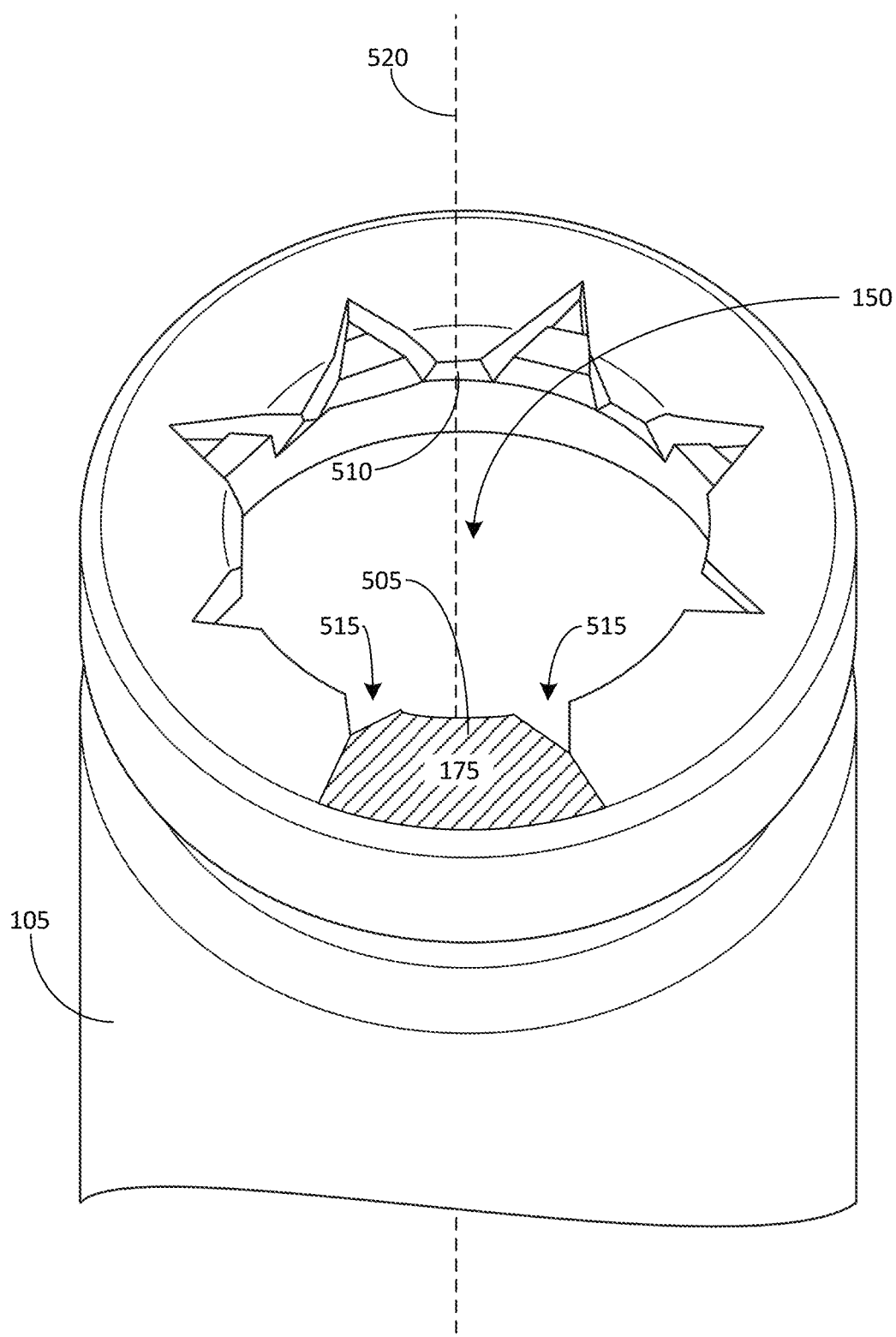
FIG. 6 depicts an example housing for a battery cell, according to an illustrative implementation.

FIG. 6 depicts an example housing 105 for a battery cell 100. The housing 105 of FIG. 6 is similar to the housing 105 shown in FIG. 5, however FIG. 6 depicts the housing 105 in a crimped configuration. That is, the material at the open end 150 of the housing 105 has been crimped such that the tabs 505 are pressed inward toward the center of the housing 105, resulting in a flat crimped area 175 associated with each tab. As shown, because the tabs 505 are separated from one another by valley regions 515, the tabs 505 can be crimped in this manner with pressing into one another. As a result, the crimped area 175 can remain flatter than if a cylindrical housing 105 (e.g., a housing 105 having an even rim pattern) were used. For example, the curvature or deformation of the crimped area 175 shown and described in connection with in FIG. 1, among others, can be reduced or eliminated by using a housing 105 having an uneven rim pattern, as depicted in FIG. 6.

Also depicted in FIG. 6, the peak regions 510 or each tab 505 can still be crimped in a manner that allows the peak regions 510 to engage a gasket. For illustrative purposes, a gasket is not depicted in FIG. 6. Thus, by employing a housing 105 having an uneven rim pattern, it is possible to crimp the housing 105 to achieve both a good seal between the housing 105 and a gasket, as well as a flat topography to facilitate wire bonding. In this example, the crimping operation can reduce or eliminate sloping in the crimped area 175 and can provide one or more peak regions 510 that partially penetrate, dig into, or otherwise engage with a gasket to create an effective seal between the housing 105 and the gasket. Rather than a cylindrical housing 105 with an even or flat rim at the open end 150 for crimping, the battery cell 100 described herein includes the housing 105 subjected to an additional cutting or shaping operation at the open end 150 of the housing 105 to achieve the appropriate space for the housing 105 material (e.g., the tabs 505) to spread out during crimping. The housing 105 having the uneven rim pattern is therefore unique in both the pre-crimped and post-crimped state, and the uneven rim pattern exists in both the pre-crimped and post-crimped state.

For illustrative purposes, one of the flat crimped areas 175 is shaded in FIG. 6. The flat crimped area 175 extends inward from the sidewall of the housing 105 in a direction perpendicular to the sidewall of housing 105. In some examples the flat crimped area 175 can be within about 10 degrees of perpendicular to the sidewall of the housing 105. In some examples, the flat crimped area can have a slope of less than 15 degrees. The flat crimped area 175 can have an area between one square millimeter and five square millimeters. Each tab 505 can be associated with its own respective flat crimped area 175. The flat crimped areas 175 can each have the same size, shape, thickness, and surface area. In some other examples, any of the size, shape, thickness, or surface area of the flat crimped areas 175 may differ from one another.

Figure 7:
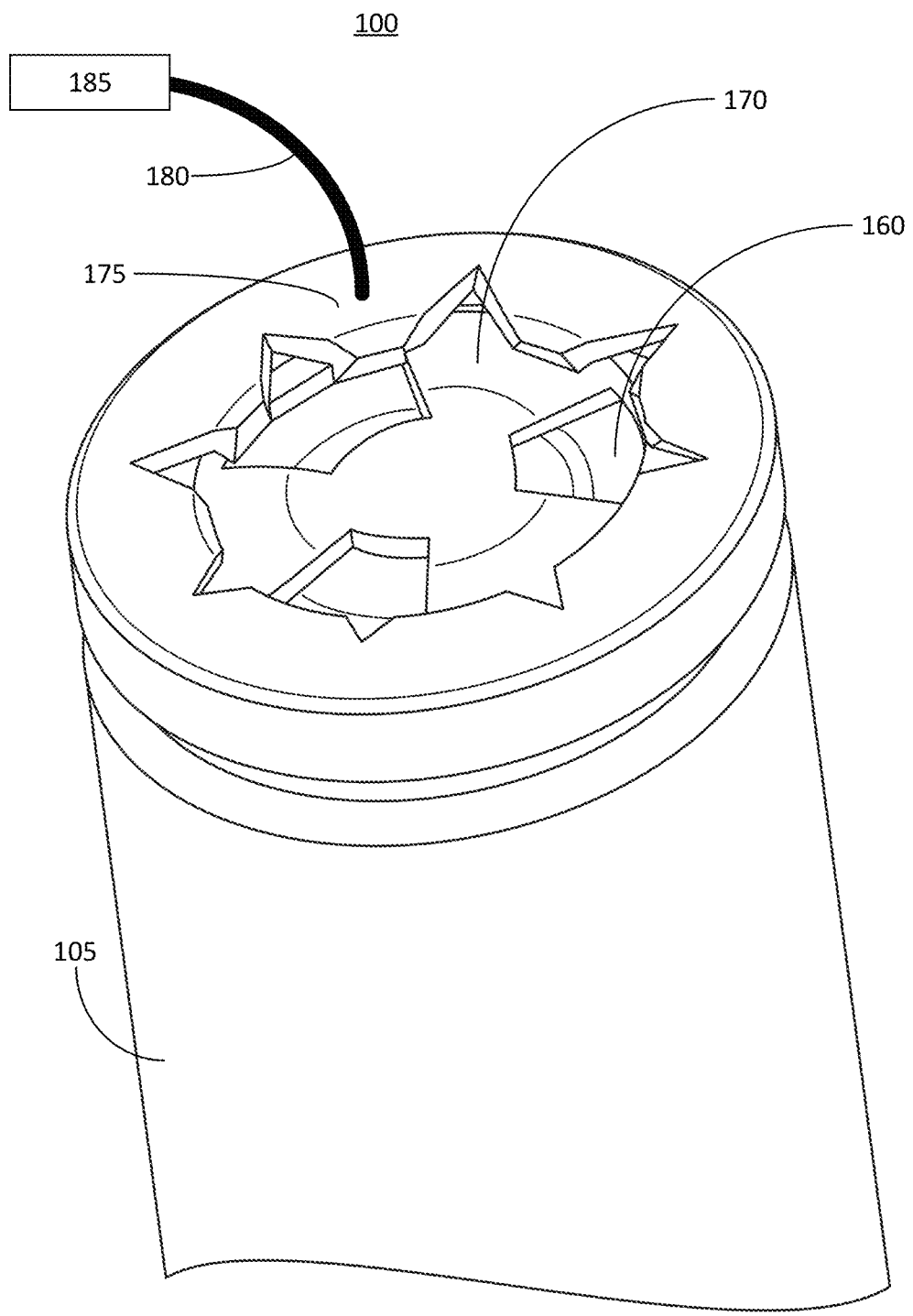
FIG. 7 depicts an example battery cell for an electric vehicle battery pack, according to an illustrative implementation.

FIG. 7 depicts an example battery cell 100 for an electric vehicle battery pack, according to an illustrative implementation. The battery cell 100 of FIG. 7 includes a housing 105 similar to that shown in FIG. 6. Also depicted in FIG. 7 is the gasket 170. The gasket 170 includes openings through which the first polarity terminal 160 is exposed.

The housing 105 can engage or press into the gasket 170 to form a seal between the housing 105 and the gasket 170. For example, the peak regions 515 of each tab 505 can be crimped or pressed so that they penetrate into at least a portion of the gasket 170. In addition, the flat crimped areas 175 of each tab 505 of the housing 105 can serve as a surface for bonding of a wire 180. The wire 180 is bonded at one end to one of the flat crimped areas 175, and is bonded at an opposite end to a current collector 185. The flatness and uniformity of topography that results from the uneven rim pattern of the housing 105 can help to ensure that the bonding of the wire 180 to the flat crimped area 175 is reliable. Each flat crimped area 175 can have a surface area in the range of one square millimeter to five square millimeters. For example, each flat crimped area 175 can have a surface area of one square millimeter, two square millimeters, three square millimeters, four square millimeters, or five square millimeters. In some examples, each flat crimped area can have a surface area larger than five square millimeters. Any of the flat crimped areas 175 of the housing 105 can therefore serve as a second polarity terminal for the battery cell 105 that is electrically coupled with the current collector 185 via the wire 180. In some examples, another wire can be bonded at one end to the first polarity terminal 160, and at an opposite end to another current collector. For example, the openings in the gasket 170 can provide spaces that expose portions of the first polarity terminal 160 for purposes of wire bonding to the first polarity terminal 160.

Figure 8:
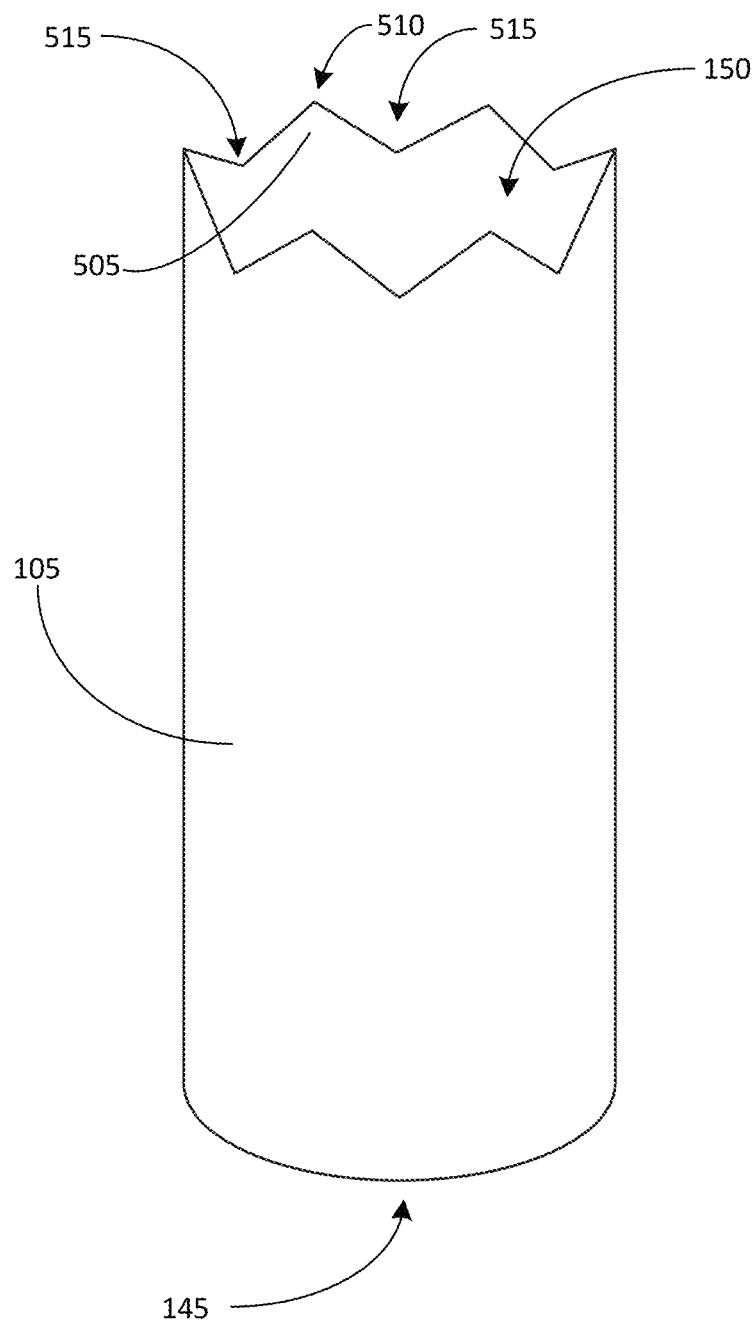
FIG. 8 depicts an example housing for a battery cell, according to an illustrative implementation.

FIG. 8 depicts an example housing 105 for a battery cell 105. The housing 105 can be or include a tubular component having a closed end 145 and an open end 150. A sidewall of the housing 105 can extend between the open end 150 and the closed end 145. The housing 105 can include an uneven rim pattern having a plurality of peak regions 510 and a plurality of valley regions 515 at the open end 150 of the housing 105. Together, the plurality of peak regions 510 and a plurality of valley regions 515 define a plurality of tabs 505. The housing 105 depicted in FIG. 8 differs from that shown in FIG. 7 in that FIG. 8 depicts the housing 105 as having only six tabs 505, rather than 8. The tabs of the housing 105 can have a triangular or pointed shape, rather than a rounded, wavelike shape.

The housing 105 is shown in an unassembled (e.g., uncrimped, or pre-crimped) configuration in FIG. 8. One or more crimping operations can be applied to the housing 105 to fold the tabs 505 inward, thereby creating a flat crimped area for each tab 505 that can be used for bonding of a wire to allow the housing 105 to serve as a second polarity terminal of a battery cell. The uneven rim patterns shown in FIG. 5 and FIG. 8 (e.g., the shape and arrangement of the peak regions 510, the valley regions 515, and the tabs 505) are only examples. Other shapes and arrangements are possible. For example, a housing 105 may have an uneven rim pattern defining at least two tabs 505, at least four tabs 505, at least six tabs 505, at least eight tabs 505, at least ten tabs 505, or at least twelve tabs 505. A housing 105 may also have an uneven rim pattern defining a number of tabs 505 outside of these ranges. The tabs 505 may also have different shapes than those depicted in FIGS. 5 and 8. For example, a housing 105 may have tabs 505 having a curved shape, a semicircular shape, a rounded shape, a wavelike shape, a triangular shape, a rectangular shape, or any other type of shape defined by any number of peak regions 510 and valley regions 515. In some examples, a housing 105 may have an uneven rim pattern having tabs with a variety of shapes and sizes, which may be arranged in a radially symmetric or asymmetric fashion around the open end 150 of the housing 105.

Figure 9:
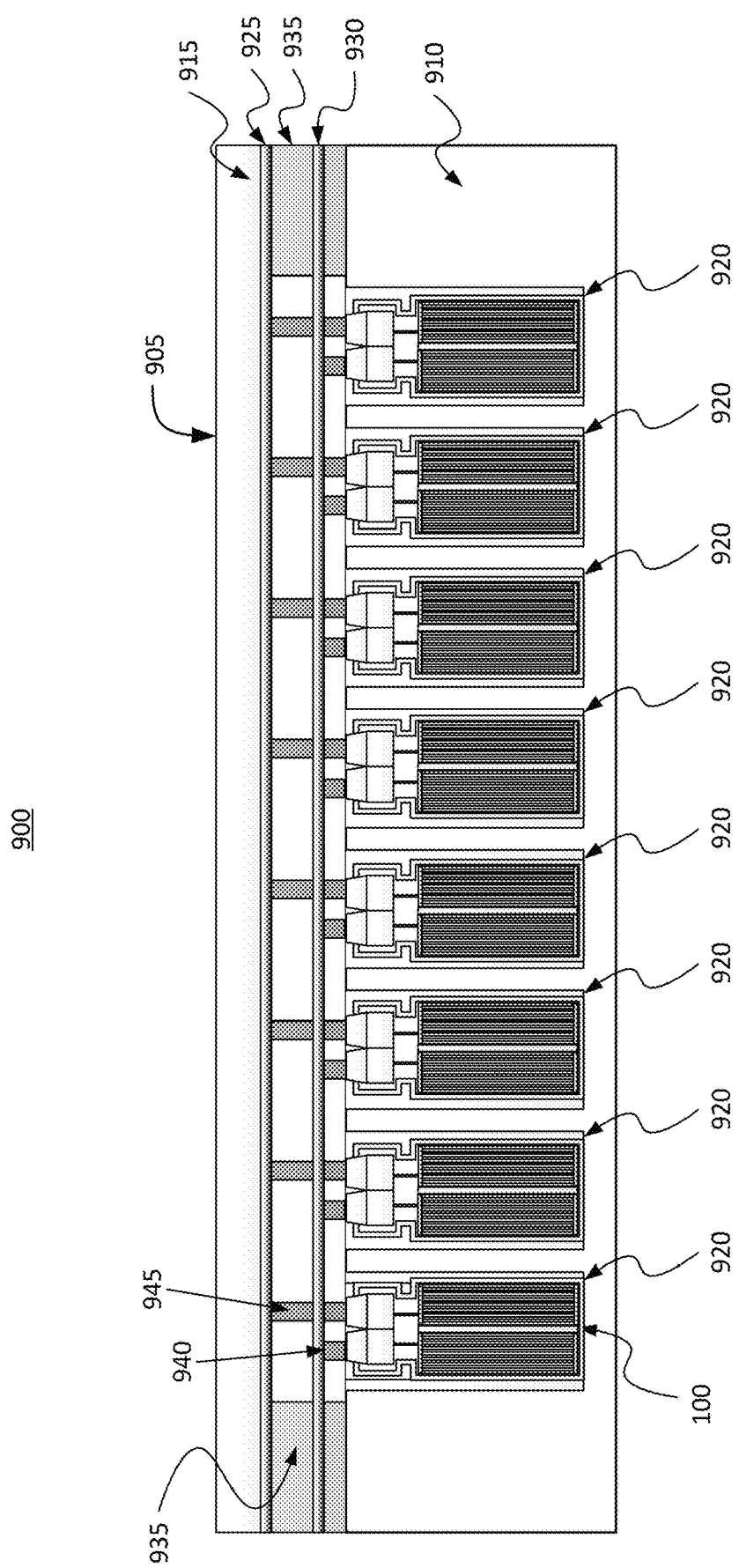
FIG. 9 depicts a cross-sectional view of an example battery pack for holding battery cells in an electric vehicle, according to an illustrative implementation.

FIG. 9, depicts is a cross-section view 900 of a battery pack 905 to hold a plurality of battery cells 100 in an electric vehicle. The battery pack 905 can include a battery module case 910 and a capping element 915. The battery module case 910 can be separated from the capping element 915. The battery module case 910 can include or define a plurality of holders 920. Each holder 920 can include a hollowing or a hollow portion defined by the battery module case 910. Each holder 920 can house, contain, store, or hold a battery cell 100. The battery module case 910 can include at least one electrically or thermally conductive material, or combinations thereof. The battery module case 910 can include one or more thermoelectric heat pumps. Each thermoelectric heat pump can be thermally coupled directly or indirectly to a battery cell 100 housed in the holder 920. Each thermoelectric heat pump can regulate temperature or heat radiating from the battery cell 100 housed in the holder 920. Bonding elements 950 and 955, which can each be electrically coupled with a respective one of the positive terminal 115 or a negative terminal (e.g., the lip 110 of the housing 105) of the battery cell 100, can extend from the battery cell 100 through the respective holder 920 of the battery module case 910.

Between the battery module case 910 and the capping element 915, the battery pack 905 can include a first busbar 925, a second busbar 930, and an electrically insulating layer 835. The first busbar 925 and the second busbar 930 can each include an electrically conductive material to provide electrical power to other electrical components in the electric vehicle. The first busbar 925 (sometimes referred to as a first current collector) can be connected or otherwise electrically coupled with the first bonding element 950 extending from each battery cell 100 housed in the plurality of holders 920 via a bonding element 945. The bonding element 945 can be bonded, welded, connected, attached, or otherwise electrically coupled with the bonding element 950. For example, the bonding element 945 can be welded onto a top surface of the bonding element 950. The second busbar 930 (sometimes referred to as a second current collector) can be connected or otherwise electrically coupled with the second bonding element 955 extending from each battery cell 100 housed in the plurality of holders 920 via a bonding element 940. The bonding element 940 can be bonded, welded, connected, attached, or otherwise electrically coupled with the second bonding element 955. For example, the bonding element 940 can be welded onto a top surface of the second bonding element 955. The second busbar 930 can define the second polarity terminal for the battery pack 905.

The first busbar 925 and the second busbar 930 can be separated from each other by the electrically insulating layer 935. The electrically insulating layer 935 can include spacing to pass or fit the first bonding element 950 connected to the first busbar 925 and the second bonding element 955 connected to the second busbar 930. The electrically insulating layer 935 can partially or fully span the volume defined by the battery module case 910 and the capping element 915. A top plane of the electrically insulating layer 935 can be in contact or be flush with a bottom plane of the capping element 915. A bottom plane of the electrically insulating layer 935 can be in contact or be flush with a top plane of the battery module case 910. The electrically insulating layer 935 can include any electrically insulating material or dielectric material, such as air, nitrogen, sulfur hexafluoride ($SF_6$), porcelain, glass, and plastic (e.g., polysiloxane), among others to separate the first busbar 925 from the second busbar 930.

Figure 10:
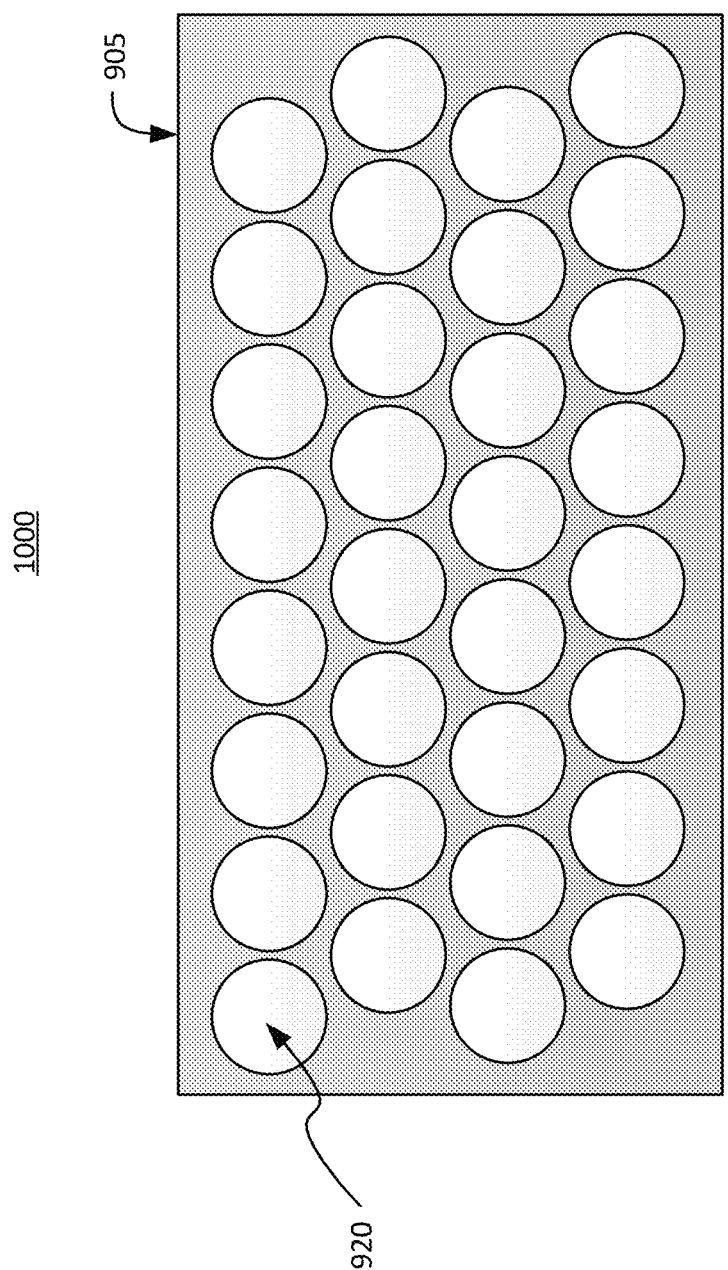
FIG. 10 depicts a top-down view of an example battery pack for holding for battery cells in an electric vehicle, according to an illustrative implementation.

FIG. 10 depicts a top-down view 1000 of a battery pack 905 to hold a plurality of battery cells 100 in an electric vehicle. The battery pack 905 can define or include a plurality of holders 920. The shape of each holder 920 can be triangular, rectangular, pentagonal, elliptical, and circular, among others. The shapes of each holder 920 can vary or can be uniform throughout the battery pack 905. For example, some holders 920 can be hexagonal in shape, whereas other holders can be circular in shape. The shape of the holder 920 can match the shape of a housing of each battery cell 100 contained therein. The dimensions of each holder 920 can be larger than the dimensions of the battery cell 100 housed therein.

Figure 11:
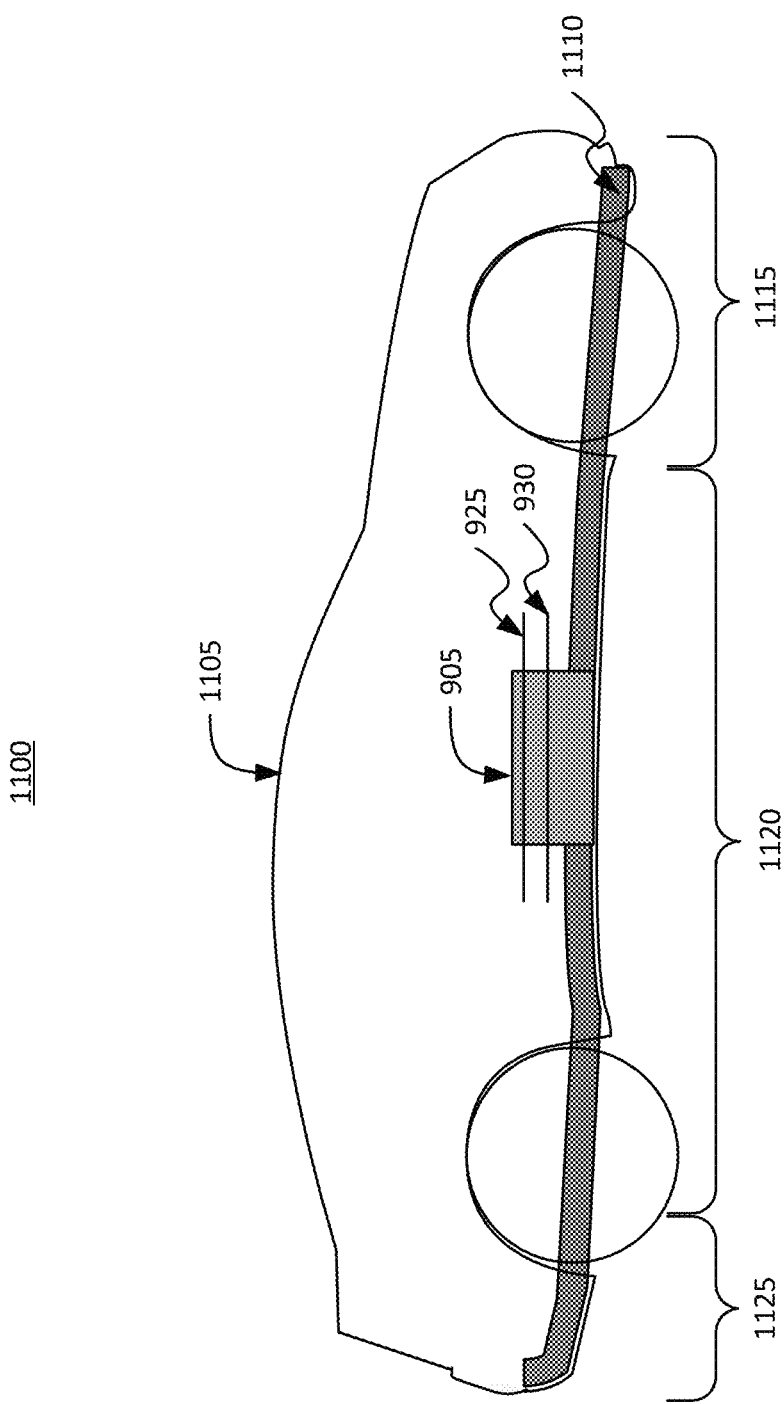
FIG. 11 depicts a cross-sectional view of an example electric vehicle installed with a battery pack, according to an illustrative implementation.

FIG. 11 depicts is a cross-section view 1100 of an example electric vehicle 1105 installed with a battery pack 905. The electric vehicle 1105 can include a chassis 1110 (e.g., a frame, internal frame, or support structure). The chassis 1110 can support various components of the electric vehicle 1105. The chassis 1110 can span a front portion 1115 (e.g., a hood or bonnet portion), a body portion 1120, and a rear portion 1125 (e.g., a trunk portion) of the electric vehicle 1105. The battery pack 905 can be installed or placed within the electric vehicle 1105. The battery pack 905 can be installed on the chassis 1110 of the electric vehicle 1105 within the front portion 1115, the body portion 1120 (as depicted in FIG. 11), or the rear portion 1125. The first busbar 925 and the second busbar 930 can be connected or otherwise be electrically coupled with other electrical components of the electric vehicle 1005 to provide electrical power. The battery cells 100 referred to above in connection with FIGS. 9-11, among others, may each include a housing 105 having an uneven rim pattern at an open end 150 to define a plurality of tabs 505 for wire bonding after a crimping operation. For example, the crimping operation can produce one or more flat crimped areas 175 suitable for wire bonding. In some examples, a wire can be bonded from such a flat crimped area 175 on each battery cell to either the busbar 925 or the busbar 930. Thus, each the busbar 925 or the busbar 930 may serve as a current collector similar to the current collector 180 shown in FIGS. 1 and 7.

Figure 12:
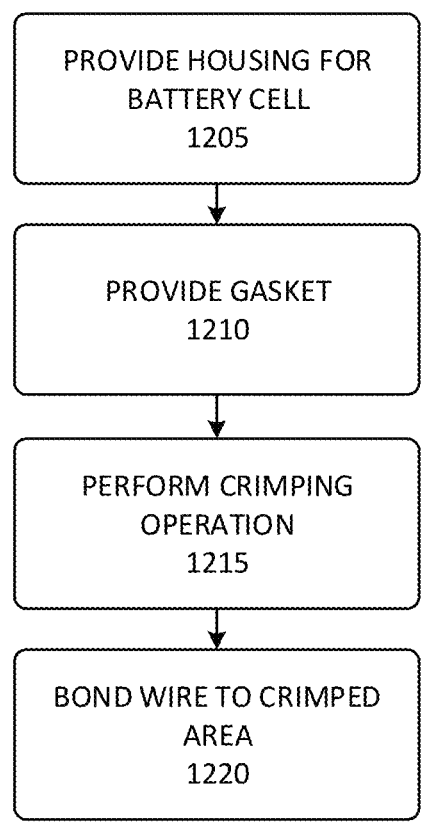
FIG. 12 depicts a flow chart of an example process for manufacturing a battery cell for a battery pack of an electric vehicle, according to an illustrative implementation.

FIG. 12 depicts a flow chart of an example process 1200 for manufacturing a battery cell 100 for a battery pack of an electric vehicle. The process 1200 can include providing a housing 105 for the battery cell 100 (ACT 1205). The housing can be a tubular component that defines a sidewall of the battery cell 100. The sidewall can extend longitudinally between an open end 150 of the housing 105 and a closed end 145 of the housing 105. The housing 105 can be formed from a structurally solid materially. The housing 105 can be formed from an electrically conductive material, such as a metal or alloy. For example, the housing 105 can be or can include steel, copper, or aluminum.

The open end of the housing 105 can include an uneven rim pattern having a plurality of peak regions 510 and a plurality of valley regions 515 to define a plurality of tabs 505. The tabs 505 can be arranged around the open end 150 of the housing 105 in a symmetric or asymmetric fashion. The open end 150 of the housing 105 can include any number of tabs 505 defined by any number of peak regions 510 and valley regions 515. For example, the open end 150 of the housing 105 can include between two and 12 tabs 505. In some examples, the open end 150 of the housing 105 can include more than 12 tabs 505. The tabs 505 can have a variety of shapes. For example, the tabs 505 can have a curved, rounded, semicircular, or wavelike shape. The tabs 505 can also have a shape characterized by sharp corners, such as a triangular, rectangular, or saw tooth shape. In some examples, the tabs 505 may have different shapes from one another. For example, the open end 150 of the housing 105 may include one or more tabs 505 having a rounded shape, and one or more other tabs 505 having a shape with sharp corners.

Each tab 505 can have an area between one square millimeter and five square millimeters. For example, each tab 505 can have an area of one square millimeter, two square millimeters, three square millimeters, four square millimeters, five square millimeters. In some examples, each tab 505 may have a surface area larger than five square millimeters. The tabs 505 can have a length in the range of 3 millimeters to 8 millimeters. Stated differently, a distance between a peak region 510 and an adjacent valley region 515 at the open end 150 of the housing 105 can be in the range of 2 millimeters to 15 millimeters. The tabs 505 can also have a uniform thickness (e.g., the thickness of all tabs can be the same), which can be equal to a thickness of a remainder of the housing 105, including a sidewall of the housing 105.

The housing can have a height in the range of 65 millimeters to 75 millimeters. In some examples, the height can be measured from the closed end 145 of the housing 105 to the top of a peak region 510 at the open end 150 of the housing 105. In some examples, the height can be measured from the closed end 145 of the housing 105 to the bottom of a valley region 515 at the open end 150 of the housing 105. The tabs themselves may be formed, for example, by removing some material from the open end 150 of the housing 105. For example, the housing 105 can initially have a cylindrical shape in which the rim at the open end 150 has an even pattern, such as a circular shape matching the cross sectional shape of a remainder of the housing 105. Some of the material at the open end 150 can then be removed to create the peak regions 510 and the valley regions 515, which can define the tabs 505.

The process 1200 can include providing a gasket 170 inside the housing (ACT 1210). The gasket 170 can be formed from an electrically insulating material, such as a plastic or rubber material. For example, the gasket can be formed from polypropylene. The gasket 170 can surround an interior edge of the housing 105 near the open end 150 of the housing 105. For example, the gasket can be positioned around a first polarity terminal 160 of the battery cell 100 near the open end 150 of the housing 105 to electrically insulate the first polarity terminal 160 from the housing 105. In some examples, the process 1200 can also include disposing an electrolyte material 155 inside the housing and electrically coupling at least a portion of the electrolyte material 155 with the first polarity terminal 105.

The process 1200 can include performing at least one crimping operation on the housing 105 (ACT 1215). The crimping operation can include any process that bends, molds, or otherwise deforms one or more portions of the housing 105 to define a neck region 140 of the housing 105. The neck region 140 can be positioned between a head region 130 and a body region 135. The neck region 140 can support the first polarity terminal 160 of the battery cell 100. The one or more crimping operations can cause the plurality of tabs 505 to engage the gasket 170. For example, the tabs 505 can press into or penetrate at least a portion of the gasket 170, thereby forming a seal between the housing 105 and the gasket 170. Crimping of the tabs 505 to engage the gasket 170 can also result in each tab defining a respective flat crimped area 175, which can extend in a direction perpendicular to the sidewall of the battery cell 100 with a slope of less than 10 degrees. Each flat crimped area 175 can have a surface area between one square millimeter and five square millimeters extending. In some examples, each flat crimped area 175 can have a surface area equal to a surface area of one of the tabs 505. When the tabs 505 are crimped or folded to define the flat crimped areas 175, the valley regions 515 separating adjacent tabs 505 can provide space that allows the crimping operation to be accomplished without the tabs 505 pressing into one another. As a result, after crimping, the flat crimped areas 175 can have a uniform topography that can serve as a surface for bonding of a wire.

The process 1200 can also include bonding a wire 180 to the flat crimped area 175 of at least one tab 505 of the plurality tabs 505 (ACT 1220). The wire 180 can be configured to carry electrical current from the housing to a current collector 185. Thus, the process 1200 can also include bonding the wire 180 to the current collector 185. For example, a first end of the wire 180 can be bonded to the flat crimped area 175 on the housing 105, and a second end of the wire 180 can be bonded to the current collector 185. The wire 180 can be formed from a malleable and electrically conductive material, such as a conductive metal or alloy. The wire 180 can be bonded to the flat crimped area 175 on the housing 105 using a variety of techniques, including welding or ultrasonic bonding.

Figure 13:
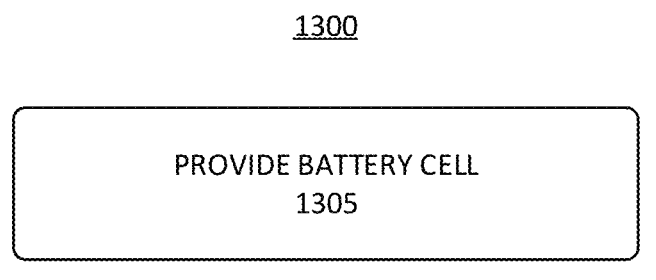

FIG. 13 depicts a flow chart of an example process 1300 of providing a battery cell 100 for a battery pack of an electric vehicle, according to an illustrative implementation. The process 1300 can include providing a battery cell (ACT 1305). The battery cell can correspond to the battery cell 100. The battery cell 100 can include a housing 105. The battery cell 100 can include a gasket 170. The housing 105 can define a sidewall of the battery cell 100. The sidewall can extend between an open end 150 of the housing 105 and a closed end 145 of the housing 105. The open end 150 of the housing 105 can include an uneven rim pattern having a plurality of peak regions 510 and a plurality of valley regions 515 to define a plurality of tabs 505. Each of the plurality of tabs 505 can include a respective one of the plurality of peak regions 510. The plurality of peak regions 515 can engage the gasket 170 to seal the housing 105 with the gasket 170. Each of the plurality of tabs 505 can define a respective flat crimped area 175 extending in a direction perpendicular to the sidewall of the battery cell 100 with a slope of less than 10 degrees. Each flat crimped area 175 can have a surface area between of one square millimeter and five square millimeters. At least one of the flat crimped areas 175 can provide a surface for bonding with a wire 180.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, sloped, vertical or other positioning or orientation descriptions include variations within +/−10% or +/−10 degrees of pure vertical, parallel, flat, or perpendicular positioning. References to "approximately," "substantially" or other terms of degree include variations of +/−100% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery cell of a battery pack to power an electric vehicle, comprising:
   a housing;
   a gasket;
   the housing defining a sidewall of the battery cell, the sidewall extending between an open end of the housing and a closed end of the housing;
   the open end of the housing including an uneven rim pattern having a plurality of peak regions and a plurality of valley regions to define a plurality of tabs;
   each of the plurality of tabs including a respective one of the plurality of peak regions, the plurality of peak regions crimped into the gasket to engage the gasket to seal the housing with the gasket;
   each of the plurality of tabs defining a respective flat crimped area extending in a direction perpendicular to the sidewall of the battery cell with a slope of less than 10 degrees, each flat crimped area having a surface area between one square millimeter and five square millimeters; and
   at least one of the flat crimped areas provides a surface to bond with a wire.

2. The battery cell of claim 1, comprising:
   a wire having a first end and a second end, the first end of the wire bonded to the flat crimped area of one of the plurality of tabs, the second end of the wire bonded to a current collector.

3. The battery cell of claim 1, comprising:
   the plurality of flat crimped areas having a uniform thickness.

4. The battery cell of claim 1, comprising:
   the plurality of flat crimped areas having a thickness equal to a thickness of the sidewall.

5. The battery cell of claim 1, comprising:
   the uneven rim pattern having radial symmetry about an axis of the battery cell that extends from the open end of the housing to the closed end of the housing in a direction parallel to the sidewall.

6. The battery cell of claim 1, comprising:
   the uneven rim pattern being radially asymmetric about an axis of the battery cell that extends from the open end of the housing to the closed end of the housing in a direction parallel to the sidewall.

7. The battery cell of claim 1, comprising:
   each of the plurality of tabs having at least one of a rectangular shape, a semicircular shape, and a triangular shape.

8. The battery cell of claim 1, comprising:
   each of the plurality of tabs having a uniform shape.

9. The battery cell of claim 1, comprising:
   the plurality of tabs including at least four tabs.

10. The battery cell of claim 1, comprising:
    the plurality of tabs including at least eight tabs.

11. The battery cell of claim 1, comprising:
    each tab having a length between 2 millimeters and 8 millimeters.

12. The battery cell of claim 1, comprising:
    the sidewall having a height between 65 millimeters and 75 millimeters.

13. The battery cell of claim 1, comprising:
    the housing having a diameter between 19 millimeters and 23 millimeters.

14. The battery cell of claim 1, comprising:
    the battery cell included in a battery pack that includes a plurality of additional battery cells.

15. The battery cell of claim 1, comprising:
    the battery cell disposed in an electric vehicle within a battery pack to provide power to the electric vehicle.

16. A method of providing a battery cell, comprising:
    providing a housing having an open end and a closed end, the housing defining a sidewall of the battery cell that extends between the open end of the housing and the closed end of the housing, the open end of the housing including an uneven rim pattern having a plurality of peak regions and a plurality of valley regions to define a plurality of tabs;
    providing a gasket inside the housing;
    performing at least one crimping operation on the housing to define a neck region of the housing to support a first polarity terminal of the battery cell and to cause the plurality of tabs to be crimped into the gasket to engage the gasket such that each tab defines a respective flat crimped area having a surface area between one square millimeter and five square millimeters extending in a direction perpendicular to the sidewall of the battery cell with a slope of less than 15 degrees to seal the housing to the gasket; and
    bonding a wire to the flat crimped area of at least one tab of the plurality tabs.

17. The method of claim 16, comprising:
removing a portion of a material forming the housing at the open end to produce the uneven rim pattern at the open end of the housing.

18. The method of claim 16, comprising:
providing an electrolyte within the housing.

19. The method of claim 16, comprising:
providing an electrolyte within the housing; and
electrically coupling the electrolyte to the first polarity terminal of the battery cell.

20. An electric vehicle, comprising:
a battery pack installed in the electric vehicle; and
a battery cell in the battery pack, comprising:
 a housing;
 a gasket;
 the housing defining a sidewall of the battery cell, the sidewall extending between an open end of the housing and a closed end of the housing;
 the open end of the housing including an uneven rim pattern having a plurality of peak regions and a plurality of valley regions to define a plurality of tabs;
 each of the plurality of tabs including a respective one of the plurality of peak regions, each of the plurality of peak regions crimped into the gasket to engage the gasket to seal the housing to the gasket;
 each of the plurality of tabs defining a respective flat crimped area extending in a direction perpendicular to the sidewall of the battery cell with a slope of less than 15 degrees, each flat crimped area having a surface area between one square millimeter and five square millimeters; and
 at least one of the flat crimped areas providing a surface to bond with a wire.

* * * * *